United States Patent [19]

Kishi et al.

[11] Patent Number: 4,700,118
[45] Date of Patent: Oct. 13, 1987

[54] SYSTEM FOR SETTING WORKPIECE CARTESIAN COORDINATE SYSTEM OF ROBOT

[75] Inventors: Hajimu Kishi, Hino; Shinsuke Sakakibara, Komae; Tatsuo Karakama, Hino, all of Japan

[73] Assignee: Fanuc Ltd., Minamitsuru, Japan

[21] Appl. No.: 928,207

[22] PCT Filed: Feb. 19, 1986

[86] PCT No.: PCT/JP86/00075

§ 371 Date: Oct. 16, 1986

§ 102(e) Date: Oct. 16, 1986

[87] PCT Pub. No.: WO86/05010

PCT Pub. Date: Aug. 28, 1986

[30] Foreign Application Priority Data

Feb. 22, 1985 [JP] Japan .................................. 60-34113

[51] Int. Cl.[4] ............................................. G05B 19/18
[52] U.S. Cl. .................................. 318/568; 219/125.1; 901/3; 901/4; 901/14; 901/42; 318/568
[58] Field of Search ............... 318/568, 568 A, 568 B, 318/568 C, 568 D, 568 E, 568 K, 568 L, 568 M; 901/3, 4, 14, 42, 16; 364/573, 731, 815, 191, 193; 219/125.1, 124.22, 124.1

[56] References Cited

U.S. PATENT DOCUMENTS

| | | | |
|---|---|---|---|
| 3,665,148 | 5/1972 | Yasenchak et al. | 901/42 |
| 4,495,588 | 1/1985 | Nio et al. | 364/513 |
| 4,511,985 | 4/1985 | Inaba et al. | 901/3 |
| 4,517,652 | 5/1985 | Bennett et al. | 901/3 |
| 4,529,921 | 7/1985 | Moribe | 318/568 |
| 4,553,077 | 11/1985 | Brantmark et al. | 318/568 B |
| 4,578,562 | 3/1986 | Lindstrom et al. | 901/3 |
| 4,581,566 | 4/1986 | Elcstrom et al. | 318/568 A |
| 4,590,577 | 5/1986 | Nio et al. | 901/4 |

Primary Examiner—William M. Shoop, Jr.
Assistant Examiner—David S. Martin
Attorney, Agent, or Firm—Staas & Halsey

[57] ABSTRACT

Provided is a system for setting a workpiece Cartesian coordinate system in a robot. In teaching the nose position (TCP) of a working member (tool) mounted on the hand of an articulated robot, the user moves the tool mounted on the hand to teach a reference point, any point on a predetermined axis and a third point defining a plane together with the other two points, whereupon a single coordinate system is specified by the position data indicative of these three points P1, P2, P3. A plurality of tool coordinate systems having a fixed relationship to the reference coordinate system of the robot can be set.

6 Claims, 5 Drawing Figures 4,700,118

SYSTEM FOR SETTING WORKPIECE CARTESIAN COORDINATE SYSTEM OF ROBOT

DESCRIPTION

1. Technical Field

This invention relates to a a robot workpiece Cartesian coordinate system setting system capable of setting a tool nose position (TCP) of a working member mounted on the wrist of an articulated robot.

2. Background Art

Industrial robots having various operating configurations have been developed, among which are polar coordinate system-type robots and articulated robots. Among these, the most widespread are articulated robots employed widely in arc welding and generally having five or six degrees of freedom, wherein link mechanisms are arranged to form an arm drive system. For example, an articulated robot configuration having six degrees of freedom includes an axis for arm sweep ($\theta$ axis), an axis for back-and-forth swiveling of a lower arm (W axis), an axis for up-and-down swiveling of an upper arm (U axis), and axes for rotating, bending and twisting a wrist (hand) ($\alpha$, $\beta$ and $\gamma$ axes, respectively). These axes are controlled independently of one another and the tool mounted on the hand is moved in accordance with the command data to cause the robot to perform a series of welding operations.

The blocks which are the basic elements of the robot command data are composed of G codes, F codes, position data and S codes. In order to improve the precision of tool control, it is necessary to correctly input the position data above all. To facilitate the creation of the command data, the arrangement is such that a plurality of workpiece Cartesian coordinate systems having a fixed relationship to the reference coordinate system of the robot can be set when the robot repeats the same operation at a plurality of working positions. However, in the conventional setting system in which metric values along each motion axis are inputted as set values and three fundamental axes XYZ are defined by hand vectors using the TCP of the hand as a reference point when the robot is at this position, a workpiece Cartesian coordinate system having a prescribed angle of rotation between itself and the reference coordinate system of the robot cannot be defined if the hand cannot be pointed in a predetermined direction in e.g. a five-axis robot. In addition, an operation for bringing the hand vectors into coincidence in the space of the Cartesian coordinate system that is desired to be designated is not easy.

DISCLOSURE OF THE INVENTION

An object of the present invention is to provide a robot workpiece Cartesian coordinate system setting system which makes it possible to set a tool position through a simple method and to control a robot in a highly precise manner.

In accordance with the present invention, there is provided a system for setting a workpiece Cartesian coordinate system of a robot when an articulated robot having a plurality of motion axes is taught and operated, characterized by having a working member mounted on a wrist of a hand of the robot, teaching means for manually feeding the hand and teaching position data, memory means for storing position data indicative of a taught tool nose position (TCP), arithmetic means for deciding a unit vector along each axis in a reference coordinate system of the robot based on position data storing a taught reference point, any point on a predetermined axis and a third poing defining a plane together with the other two points, and control means for driving the robot upon setting a workpiece coordinate system as set data based on unit vectors of a decided tool coordinate system.

More specifically, according to the present invention, the user moves the tool mounted on the hand to teach the reference point, any point on the predetermined axis and the third point defining the plane together with the other two points, whereupon a single coordinate system is specified by the position data indicative of these three points P1, P2, P3. Therefore, according to the invention, a tool position can be set through a simple method and the robot can be controlled in a highly precise manner.

Further, according to the present invention, a coordinate system is set by teaching the three points. This is an arrangement that can coexist with the conventional setting system in which hand vectors are defined by three fundametal axes XYZ using the TCP of the hand as a reference point. This allows the function of the above-described embodiment to be added on to the conventional apparatus.

BEST MODE FOR CARRYING OUT THE INVENTION

Figure 1:
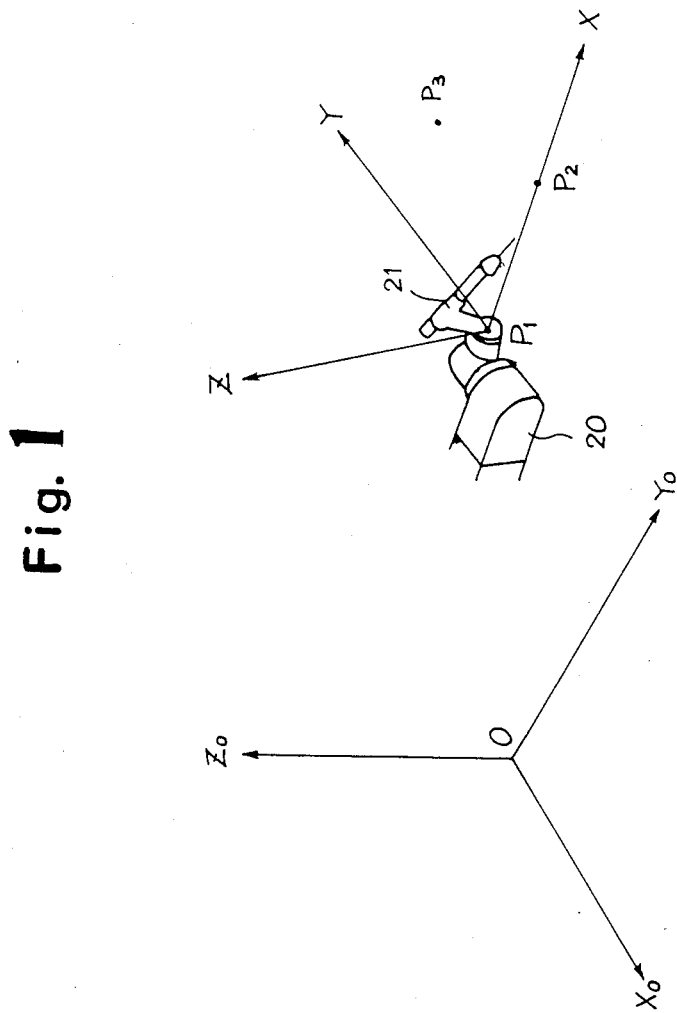
FIG. 1 is an explanatory view illustrating an example of teaching three points according to the present invention.

The present invention will now be described in detail based on an embodiment illustrated in the drawings.

Figure 2:
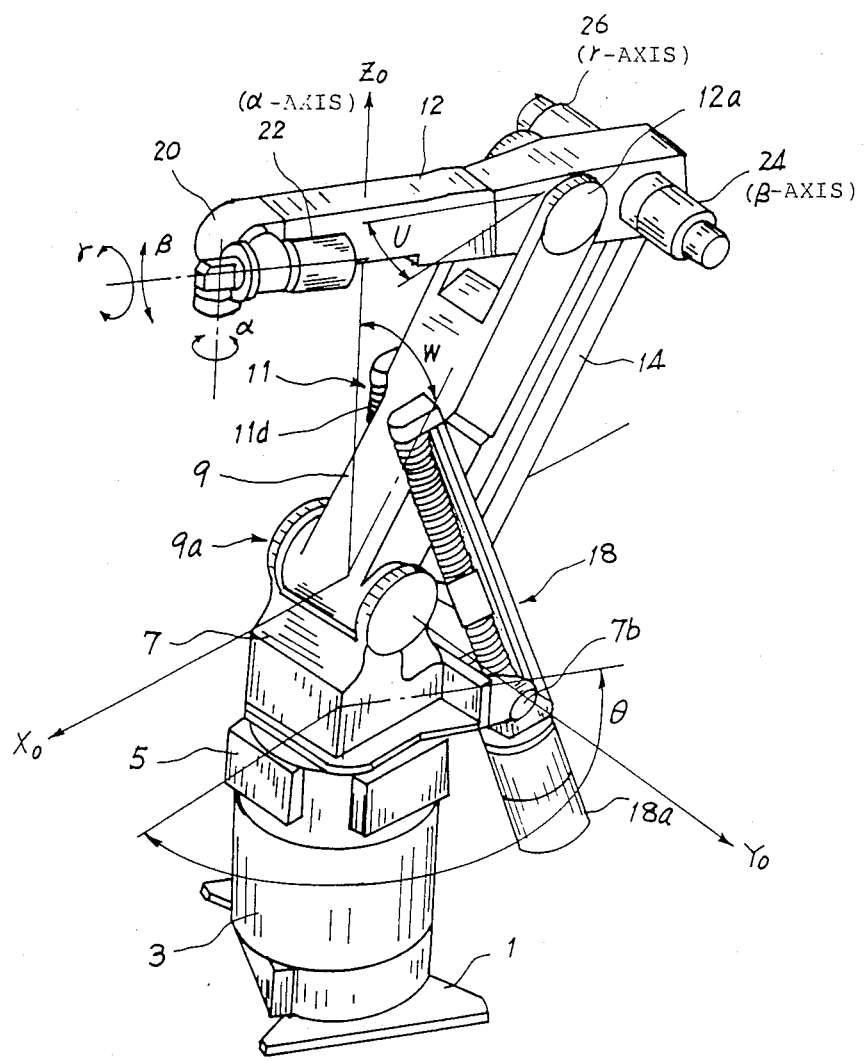
FIG. 2 is an explanatory view showing the construction of a six-axis articulated robot.

FIG. 2 is a perspective view of an articulated robot having six controlled axes. In the Figure, numeral 1 denotes a base supporting the articulated robot. Mounted on an upper portion of the base 1 is a $\theta$-axis servomotor 3 for rotating each axis about a vertical axis ($Z_0$ axis). The $\theta$-axis servomotor 3 is provided with a $\theta$-axis unit 5, which is rotated by the $\theta$-axis servomotor. The $\theta$-axis unit 5 is rotated by the $\theta$-axis servomotor 3. Fixedly provided on the $\theta$ unit 5 is a W-axis unit 7 on which a W-axis arm 9 is axially supported by a shaft 9a, the arm being freely rotatable. Numeral 11 denotes a W-axis drive mechanism comprising a W-axis servomotor, a W-axis ball screw and a W-axis nut.

A U-axis arm 12 is rotatably supported at the end of the W-axis arm 9 by a shaft 12a. The upper end of a U-axis intermediate link 14 is rotatably supported on the rear end of the U-axis shaft 12. A U-axis lower link is freely rotatably supported in coaxial relation with respect to the shaft 9a of the W-axis, and the lower end of the U-axis intermediate link 14 and the end portion of the U-axis lower link are freely rotatably supported on each other. The W-axis arm 9 and the U-axis intermediate link 14 are arranged in parallel, as are the U-axis 12 and U-axis lower link. These form link mechanisms with each other. Numeral 18 denotes a U-axis drive mechanism. The U-axis drive mechanism 18 comprises a U-axis servomotor 18a, a U-axis ball screw and a U-axis nut. The U-axis servomotor 18a is rotatably supported on a support portion 7b extending from the W-axis unit 7.

The end of the U-axis arm 12 is provided with a wrist mechanism (hand) 20, which is rotated by the α-axis servomotor 22, bent up and down by the β-axis servomotor 24, and twisted by the γ-axis servomotor 26. The structure and operation of these elements are well-known and a detailed description thereof is omitted. As shown in FIG. 1, a tool 21 such as an arc welding torch is attached.

Figure 3:
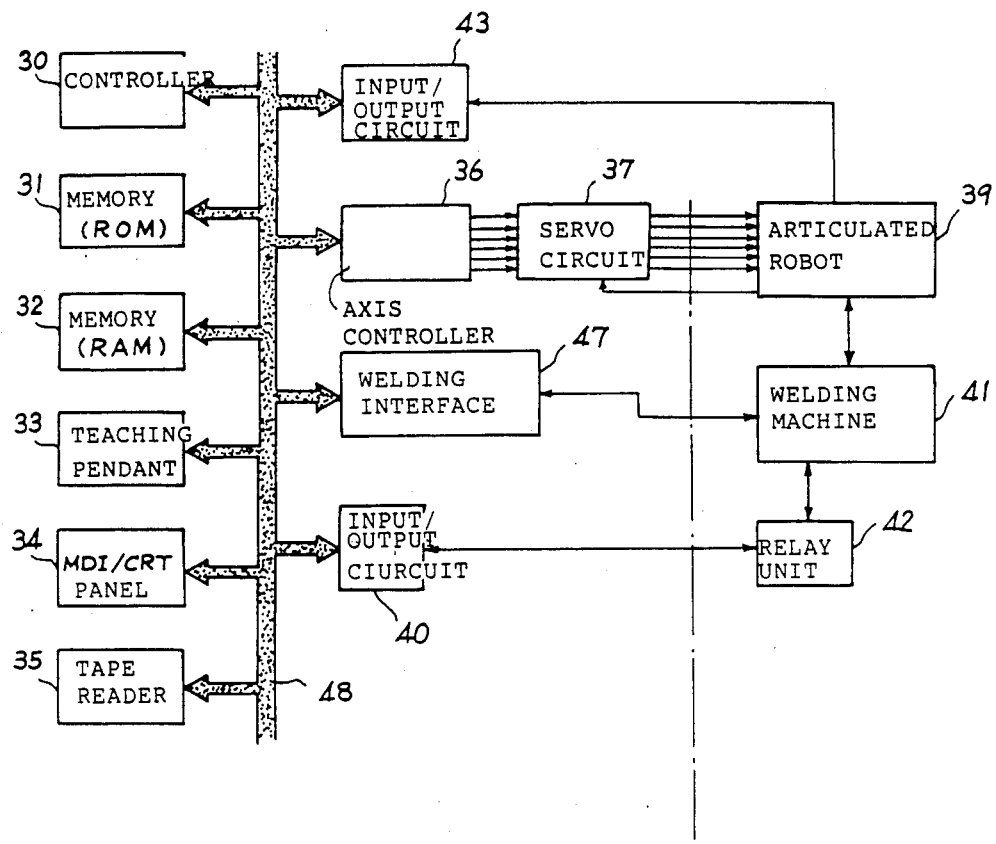
FIG. 3 is a block diagram illustrating a circuit arrangement of an embodiment of the present invention.

FIG. 3 is a block diagram illustrating an embodiment in which the aforementioned articulated robot is applied to welding. In FIG. 3, the left side of the one-dot chain line is a numerical control unit (hereafter referred to as an "NC unit"), in which numeral 30 denotes a controller including a central processor. Asscciated with the controller 30 are a memory 31 comprising a ROM, a memory 32 comprising a RAM, a teaching pendant 33, an operator's panel 34 having an MDI/CRT panel, and a tape reader 35.

The memory 31 stores various control programs to be executed by the controller 30. The memory 32 stores teaching data inputted from the teaching pendant 33, operator's panel 34 and tape reader 35, position data inputted from the operator's panel 34, the results of calculations performed by the controller 30, and other data. The teaching pendant 33 has a numerical value display, lamps and control buttons necessary for operating the articulated robot. The operator's panel 34 has a display unit including a CRT, as well as various keys such as numeric and function keys, and is for feeding various data into the NC unit from the outside. Numeral 36 denotes an axis controller including an interpolator for controlling a plurality of axes; 37 a servo circuit for controlling the driving source of the articulated robot 39; 40 an input/output circuit for signal input/output with the welding machine 41 via a relay unit 42; 43 an input/output circuit for inputting feedback signals such as an overtravel signal and stroke limit signal to the NC unit; 47 a welding machine interface for interfacing the welding machine 41; and 48 a bus line.

Figure 4:
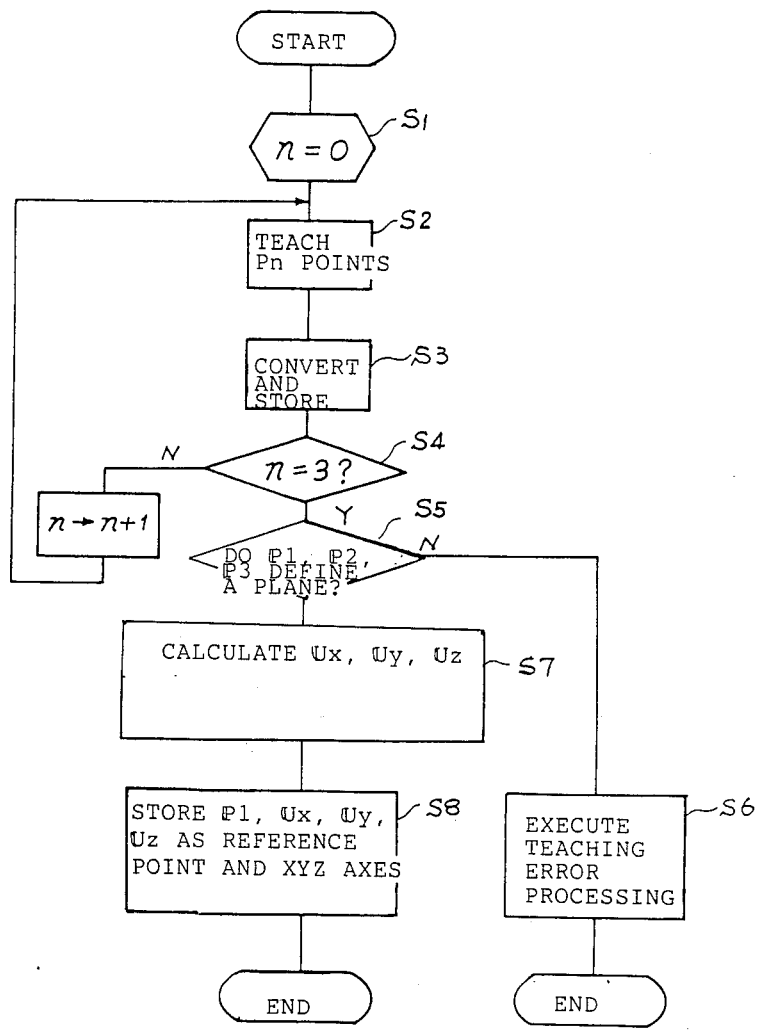
FIG. 4 is a flowchart illustrating coordinate system setting processing according to the same embodiment.

Next, a calculating procedure for setting a tool coordinate system will be described with reference to the flowchart shown in FIG. 4.

First, a power switch on the operator's panel 34 is closed to start the robot, then a state is established that enables control from the teaching pendant 33. When a coordinate system is selected by a coordinate system selection key on the teaching pendant 33 in order to perform manual feed, processing for setting a Cartesian coordinate system begins. Starting from a state n=0 (step S1), points Pn are taught until n=3 is attained (steps S2–S4), and these points are converted into base coordinates in the hand coordinate system and then stored in the memory 32. When position data indicative of position vectors P1, P2, P3 expressed by the following equations are stored in memory 32, it is determined whether these position vectors P1, P2, P3 define a plane (step S5):

P1=(P1X, P1Y, P1Z)

P2=(P2X, P2Y, P2Z)

P3=(P3X, P3Y, P3Z)

If it is determined from the above position data that the position vectors P1, P2, P3 do not define a plane, then teaching error processing is executed and a display to this effect is presented on the CRT screen (step S6). If the position vectors do define a plane, unit vectors along the respective axes of the tool coordinate system are calculated in accordance with the following equations:

$$U_x = (P2-P1)/|P2-P1|$$

$$U_z = U_x * (P3-P1)|U_x * (P3-P1)|$$

$$U_y = U_z * U_x$$

Ux, Uy, Uz are mutually orthogonal unit vectors that define a right-handed system.

The unit vectors thus decided are stored in the memory 32 as set data together with the position vector P1. Thus is defined a Cartesian coordinate system (step S8).

Figure 5:
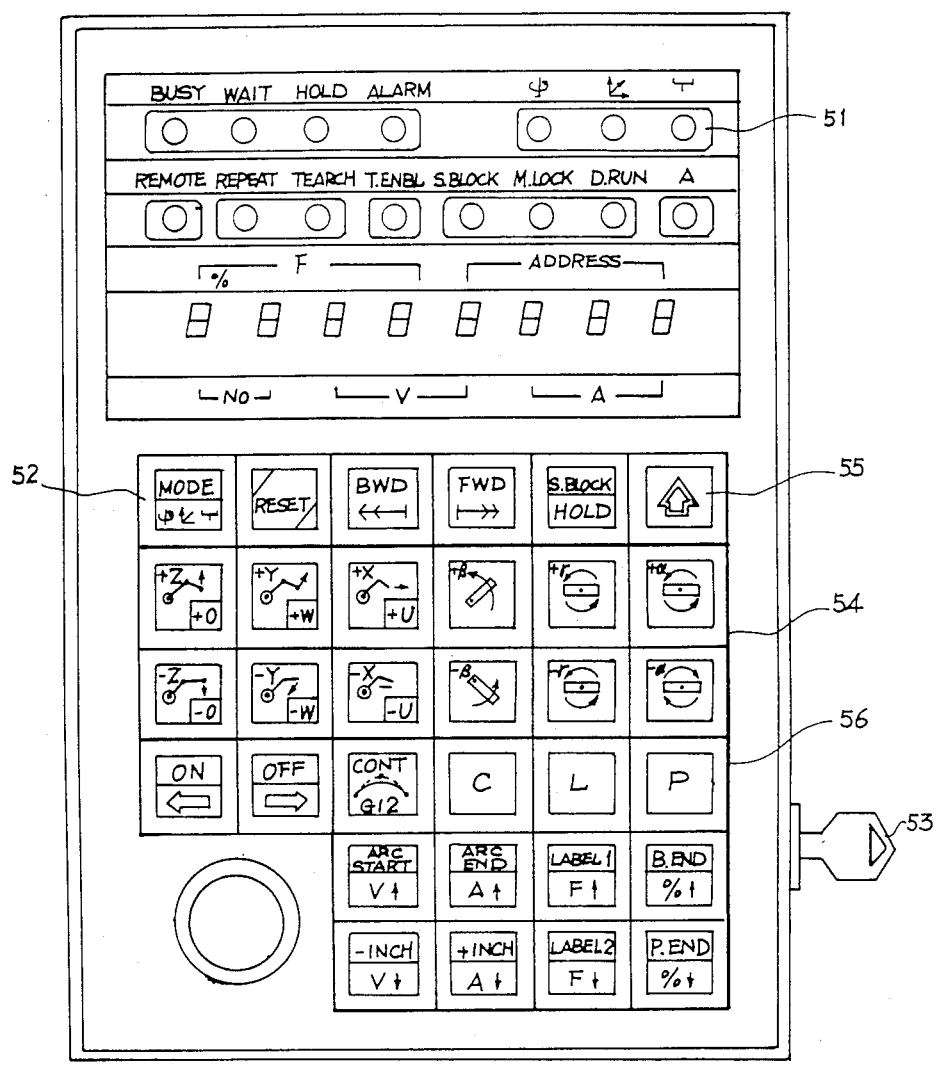
FIG. 5 is a plan view illustrating a teaching pendant of a robot.

Described next with be an example of an operating method for setting a Cartesian coordinate system. FIG. 5 illustrates an example of a teaching pendant used in setting the aforementioned Cartesian coordinate system.

Numeral 51 denotes a coordinate system selection lamp; 52 a mode key; and 53 a switch. A tool is secured to the mounting face of a robot hand, the correct position of gripping point (TCP) is set to set data numbers 9 and 43–51, and a page which appears as USER FRAME DEFINITION on the CRT screen is designated. When this is done, an operator control procedure indicating operations 1–7, described below, is displayed, and the teaching mode is selected by the mode key 52. In addition, when the working space of the Cartesian coordinate system desired to be designated is set to e.g. number 3 of the user coordinate system, "3" and "INPUT" are keyed in at the MDI panel (operation 1).

An input is made indicating whether the TCP, namely the wire tip coordinates of the are welding torch, is being set by a hand-and-eye method or by an external fixed camera (external fixed coordinates) (operation 2). The TCP is moved by the manual feed key 54 to a position that will be the reference point of the coordinate system, and the reference point P1 is taught by using the case shift key 55 and P (position) teaching key 56 (operation 3).

Next, as in operation 3, point P2 on the X axis of the coordinate system to be set is taught (operation 4), and a point P3, which is in the X-Y plane of the coordinate system to be taught, is taught that will make the Y coordinate value positive (operation 5).

In a case where the input operaton is made by the hand-and-eye method in operation 2, the attitude of the hand 20 prevailing when the position vectors P1, P2, P3 are taught is taught in order to perform a calibration on the sensor side (operation 6). When the TCP is being set by the external fixed camera, this operation is unnecessary. An operation for starting the calculation of the coordinate system to be defined based on the data inputted to the memory 32 by the foregoing operations is performed by keying in "G", "0", "INPUT" at the MDI panel (operation 7).

When position data indicative of the three points as well as the coordinate system based thereon have been set through the operations 1–7, the Cartesian coordinate system information is stored automatically as set data. However, if it is determined that the three points lie on a straight line or that two of the points are the same, a message reading REFERENCE POINT ERROR is displayed on the CRT screen and the set data in memory 32 are not rewritten. Further, if it is desired to clear the operator control procedure from the screen, it will suffice to key in "C", "A", "N" and "INPUT". To revise the inputted information, the input is made again upon placing a cursor at the position where the revision is desired. Thereafter, operation 7 is performed to reset the coordinate system.

Since the setting of the coordinate by the teaching of three points adopts an arrangement that can coexist with the conventional setting system in which hand vectors are defined by three fundametal axes XYZ using the TCP of the hand as a reference point, the function of the above embodiment can be added onto the conventional apparatus. Moreover, since the user can set a Cartesian coordinate system to be defined while neglecting hand vectors, the time required for teaching can be curtailed and highly accurate tool control can be achieved.

Though the above embodiment has been described with regard to a robot which controls an arc welding torch, the invention is not limited to this embodiment. It is possible to deal with a variety of cases, such as one in which the working member (tool) mounted on the robot wrist is a gripper or the like. In teaching the tool nose position (TCP), the present invention can be widely applied to the setting of a Cartesian coordinate system of a robot capable of setting a plurality of tool coordinate systems having a fixed relationship to the reference coordinate system of the robot. The invention can be modified in various ways without departing from the scope of the claims.

INDUSTRIAL APPLICABILITY

The setting of a workpiece Cartesian coordinate system in a robot in accordance with the present invention as set forth above enables a tool coordinate system to be set by the teaching of three points in a robot, which has a plurality of motion axes, when the robot is taught and operated. Moreover, since the setting system has an arrangement that can coexist with the conventional setting system in which hand vectors are defined by three fundametal axes XYZ using the TCP of the hand as a reference point, a tool position can be set through a simple method and highly precise robot control is made possible.

We claim:

1. A system for setting a workpiece Cartesian coordinate system of a robot when an articulated robot having a plurality of motion axes is taught and operated, comprising:
    a working member mounted on a wrist of a hand of said robot;
    teaching means for manually feeding the hand and teaching position data;
    memory means for storing position data indicative of a taught tool nose position (TCP);
    arithmetic means for deciding a unit vector along each axis in a reference coordinate system of the robot based on position data storing a taught reference point, any point on a predetermined axis and a third point defining a plane together with the other two points; and
    control means for driving said robot upon setting a workpiece Cartesian coordinate system as set data based on unit vectors of a decided tool coordinate system.

2. A system for setting a Cartesian coordinate system of a robot according to claim 1, characterized in that said articulated robot is a six-axis articulated robot.

3. A system for setting a Cartesian coordinate system of a robot according to claim 1, characterized in that said working member is a torch for arc welding.

4. A system for setting a Cartesian coordinate system of a robot according to claim 1, characterized in that said teaching means includes a teaching pendant operatively associated with a sensor for sensing position of the working member, and a display screen, said teaching means being adapted to indicate an operating procedure to a user and to display taught data.

5. A system for setting a Cartesian coordinate system of a robot according to claim 1, characterized in that said arithmetic means has a function for determining whether position vectors P1, P2, P3, which express position data of three taught TCPs in a base coordinate system of the robot, define a plane.

6. A system for setting a Cartesian coordinate system of a robot according to claim 1, characterized in that the deciding of the unit vectors in said arithmetic means is done by performing calculations in accordance with the following equations:

$$U_x = (P2 - P1)/|P2 - P1|$$

$$U_z = U_x * (P3 - P1)/|U_x * (P3 - P1)|$$

$$U_y = U_z * U_x$$

based on position vectors P1, P2, P3 expressing position data of three taught TCPs in a base coordinate system of the robot.

* * * * *

UNITED STATES PATENT AND TRADEMARK OFFICE
CERTIFICATE OF CORRECTION

PATENT NO. : 4,700,118

DATED : Oct. 13, 1987

INVENTOR(S) : Kishi et al.

It is certified that error appears in the above-identified patent and that said Letters Patent is hereby corrected as shown below:

FRONT PAGE

[73] "Ltd.," s/b --Ltd,--.

Col. 2, line 3, "poing" s/b --point--.

Col. 4, line 42, "are" s/b --arc--.

Signed and Sealed this

Nineteenth Day of April, 1988

Attest:

DONALD J. QUIGG

*Attesting Officer*  *Commissioner of Patents and Trademarks*